US012682651B2

(12) United States Patent
Sun

(10) Patent No.: US 12,682,651 B2
(45) Date of Patent: Jul. 14, 2026

(54) APPARATUS AND METHOD FOR MODIFYING GROUND TRUTH FOR CHECKING ACCURACY OF MACHINE LEARNING MODEL

(71) Applicant: WOVEN BY TOYOTA, INC., Tokyo (JP)

(72) Inventor: Linyu Sun, Miyoshi City (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 563 days.

(21) Appl. No.: 17/687,860

(22) Filed: Mar. 7, 2022

(65) Prior Publication Data

US 2023/0282002 A1 Sep. 7, 2023

(51) Int. Cl.
*G06V 20/58* (2022.01)
*G06T 7/10* (2017.01)
*G06T 7/62* (2017.01)

(52) U.S. Cl.
CPC ................ *G06V 20/58* (2022.01); *G06T 7/10* (2017.01); *G06T 7/62* (2017.01)

(58) Field of Classification Search
CPC .... G06V 20/58; G06V 10/774; G06V 10/776; G06V 20/56; G06T 7/10; G06T 7/62
See application file for complete search history.

(56) References Cited

U.S. PATENT DOCUMENTS

| | | | | |
|---|---|---|---|---|
| 10,635,844 | B1 * | 4/2020 | Roose | G06F 30/20 |
| 11,801,861 | B2 * | 10/2023 | Choe | G06N 3/08 |
| 11,804,042 | B1 * | 10/2023 | Alokhina | G06V 10/776 |
| 2015/0278632 | A1 * | 10/2015 | Rodriguez-Serrano | |
| | | | | G06V 10/25 |
| | | | | 382/160 |
| 2018/0336424 | A1 | 11/2018 | Jang et al. | |
| 2019/0220029 | A1 | 7/2019 | Fukuhara et al. | |
| 2020/0074230 | A1 | 3/2020 | England et al. | |
| 2021/0097147 | A1 * | 4/2021 | DeVore | G06F 18/22 |
| 2022/0269279 | A1 * | 8/2022 | Redford | G05D 1/0221 |
| 2022/0297707 | A1 * | 9/2022 | Redford | G06N 3/006 |
| 2023/0093385 | A1 * | 3/2023 | Figov | G06V 10/70 |
| | | | | 382/159 |

(Continued)

FOREIGN PATENT DOCUMENTS

JP    2018013832 A  *  1/2018

OTHER PUBLICATIONS

Gaidon et al., "VirtualWorlds as Proxy for Multi-object Tracking Analysis," 2016 IEEE Conference on Computer Vision and Pattern Recognition (CVPR), Las Vegas, NV, USA, 2016, pp. 4340-4349, doi: 10.1109/CVPR.2016.470. (Year: 2016).*

(Continued)

*Primary Examiner* — Emily C Terrell
*Assistant Examiner* — Julia Z. Yao
(74) *Attorney, Agent, or Firm* — Sughrue Mion, PLLC

(57) ABSTRACT

A method and apparatus for modifying ground truth data for testing the accuracy of an object detection machine learning model are provided. The method includes: obtaining image data of an image capturing area from a camera point of view; obtaining ground truth data regarding objects in the image capturing area; determining a visibility rate of an object included in the obtained image data; and modifying the ground truth data based on the determined visibility rate.

14 Claims, 8 Drawing Sheets

(56)                    References Cited

U.S. PATENT DOCUMENTS

| | | | |
|---|---|---|---|
| 2023/0237210 A1* | 7/2023 | Forshaw | G06F 11/3698 |
| | | | 703/1 |
| 2023/0298181 A1* | 9/2023 | Utasi | G06T 7/168 |
| | | | 382/100 |
| 2024/0001942 A1* | 1/2024 | Mueller | B60W 60/001 |

OTHER PUBLICATIONS

Li et al., "Amodal Instance Segmentation," European Conference on Computer Vision (ECCV), 2016, arXiv, vol. abs/1604.08202, pp. 1-23, doi: https://doi.org/10.48550/arXiv.1604.08202. (Year: 2016).*

Xiang et al., "Data-driven 3D Voxel Patterns for object category recognition," 2015 IEEE Conference on Computer Vision and Pattern Recognition (CVPR), Boston, MA, USA, 2015, pp. 1903-1911, doi: 10.1109/CVPR.2015.7298800. (Year: 2015).*

Purkait et al., "Seeing Behind Things: Extending Semantic Segmentation to Occluded Regions," 2019 IEEE/RSJ International Conference on Intelligent Robots and Systems (IROS), Macau, China, 2019, pp. 1998-2005, doi: 10.1109/IROS40897.2019. 8967582. (Year: 2019).*

Gupta et al., "Aligning 3D models to RGB-D images of cluttered scenes," 2015 IEEE Conference on Computer Vision and Pattern Recognition (CVPR), Boston, MA, USA, 2015, pp. 4731-4740, doi: 10.1109/CVPR.2015.7299105. (Year: 2015).*

Bochinski et al., "Training a convolutional neural network for multi-class object detection using solely virtual world data," 2016 13th IEEE International Conference on Advanced Video and Signal Based Surveillance (AVSS), Colorado Springs, CO, USA, 2016, pp. 278-285, doi: 10.1109/AVSS.2016.7738056. (Year: 2016).*

Wojek et al., "Monocular 3D scene understanding with explicit occlusion reasoning," CVPR 2011, Colorado Springs, CO, USA, 2011, pp. 1993-2000, doi: 10.1109/CVPR.2011.5995547. (Year: 2011).*

Li et al., "ParallelEye-CS: A New Dataset of Synthetic Images for Testing the Visual Intelligence of Intelligent Vehicles," in IEEE Transactions on Vehicular Technology, vol. 68, No. 10, pp. 9619-9631, Oct. 2019, doi: 10.1109/TVT.2019.2936227. (Year: 2019).*

Qiao et al., "ScaleNet: Guiding Object Proposal Generation in Supermarkets and Beyond," 2017 IEEE International Conference on Computer Vision (ICCV), Venice, Italy, 2017, pp. 1809-1818, doi: 10.1109/ICCV.2017.199. (Year: 2017).*

Sun et al., "Simultaneous Detection and Tracking with Motion Modelling for Multiple Object Tracking," arXiv, in Computing Research Repository (CoRR), 2020, vol. abs/2008.08826 [online]. Retrieved from the Internet <URL: https://arxiv.org/abs/2008. 08826> (Year: 2020).*

Tian et al., "Training and testing object detectors with virtual images," in IEEE/CAA Journal of Automatica Sinica, vol. 5, No. 2, pp. 539-546, Mar. 2018, doi: 10.1109/JAS.2017.7510841. (Year: 2018).*

Wrenninge et al., "Synscapes: A Photorealistic Synthetic Dataset for Street Scene Parsing," arXiv, in Computer Vision and Pattern Recognition (CVPR), 2018, vol. abs/1810.08705 [online]. [retrieved on Oct. 19, 2018]. Retrieved from the Internet <URL: https://arxiv. org/abs/1810.08705> (Year: 2018).*

* cited by examiner

APPARATUS AND METHOD FOR MODIFYING GROUND TRUTH FOR CHECKING ACCURACY OF MACHINE LEARNING MODEL

BACKGROUND

1. Technical Field

This disclosure relates to machine learning models, and more particularly to ground truth data for testing the accuracy of machine learning models.

2. Description of Related Art

Autonomous driving applications typically analyze data captured by sensors to make decisions. For example, an autonomous driving application may utilize image data captured by a camera. This image data may be input into a machine learning model that is trained using training datasets to detect objects around the vehicle.

Referring to FIG. 8, for example, objects (i.e., vehicles 101, 102, motorcyclist 103, and pedestrians 104) are perceived or detected from image data captured by a camera and may be classified into separate categories (i.e., vehicles, pedestrians, motorcyclists, etc.). A decision is made based on the detected objects, e.g., a position and/or speed of the vehicle is autonomously changed or corrected to avoid a collision with the detected object.

As described above, a machine learning model may be used for detecting objects in an image. For example, the electronic device in US2018/0336424 detects an object in a frame and recognizes a location of the object using a first trained model and a video sequence including a plurality of frames obtained during driving of a vehicle. In the automated training dataset generators of US2020/0074230, the generators generate training datasets for use in real-world autonomous driving applications based on virtual environments. The training datasets may be associated with training the machine learning model to control real-world autonomous vehicles.

Related art machine learning models are refined and updated based on testing data used to test the accuracy of the model, e.g., training data. In testing the accuracy of the model, an image from the testing data set is input into the machine learning model. The machine learning model then typically outputs results, such as two-dimensional or three-dimensional bounding boxes, classes of target objects in the image (e.g., vehicles, pedestrians, motorcycles, etc.), image segmentation, etc. To test the accuracy of the model, these results are compared against ground truth data (i.e., the actual classifications, segmentations, etc.) of the target objects in the image.

In the context of image data generated by a simulator, e.g., an image of a virtual world surrounding a vehicle model and captured by a camera sensor model of an autonomous driving simulator, the location of all target objects is included in the ground truth (e.g., ground truth data or signal). In other words, the ground truth data generated or output by the simulator includes target objects that are hidden. For example, the simulator outputs ground truth data including a vehicle that is hidden or located behind a motorcycle in the sensor-captured image of the virtual world. Where this ground truth is used to test the accuracy of the machine learning model or to define the target variables of a training data set, however, the accuracy will be low and underestimated. This is because the machine learning model is unlikely to detect hidden objects, whereas the ground truth output by a simulator includes hidden objects.

For example, in FIG. 8, the machine learning model is unlikely to detect the vehicle 102 positioned behind the vehicle 101, while the ground truth segmentation includes the entire vehicle 102.

SUMMARY

The present disclosure provides an apparatus and a method for more accurately testing a machine learning model used in autonomous driving and autonomous driving simulators, by incorporating a visibility rate for target objects included in a ground truth segmentation of testing data.

An aspect of the present disclosure provides a method for modifying ground truth data for testing the accuracy of an object detection machine learning model. The method includes: obtaining image data of an image capturing area from a camera point of view; obtaining ground truth data regarding objects in the image capturing area; determining a visibility rate of an object included in the obtained image data; and modifying the ground truth data based on the determined visibility rate.

The determining the visibility rate may include: determining a total size of the object; calculating a size of a visible area of the object in the obtained image data; and dividing the size of the visible area by the total size of the object to obtain the visibility rate.

The determining the total size of the object may include: individually rendering the object in full; and calculating an area of the individually-rendered object.

The determining the total size of the object may include: obtaining a ground truth object segmentation for a full scene of the image capturing area; and calculating an area of the object in the ground truth object segmentation.

The calculating the size of the visible area of the object in the obtained image data may include determining the number of pixels included in the visible area or determining an area of a polygon that bounds the visible area.

The obtaining the image data of the image capturing area may include obtaining the image data generated by a camera sensor model of an autonomous driving simulator.

Another aspect of the present disclosure provides an apparatus for modifying ground truth of image data for testing accuracy of an object detection machine learning model. The apparatus includes: memory storing instructions; and at least one processor configured to execute the instructions to: obtain image data of an image capturing area from a camera point of view; obtain ground truth data regarding objects in the image capturing area; determine a visibility rate of an object included in the obtained image data; and modify the ground truth data based on the determined visibility rate.

The at least one processor may be further configured to execute the instructions to: determine a total size of the object; calculate a size of a visible area of the object in the obtained image data; and divide the size of the visible area by the total size of the object to obtain the visibility rate.

The at least one processor may be further configured to execute the instructions to: individually render the object in full; and calculate, as the total size of the object, an area of the individually-rendered object.

The at least one processor may be further configured to execute the instructions to: obtain a ground truth object segmentation for a full scene of the image capturing area;

and calculate, as the total size of the object, an area of the object in the ground truth object segmentation.

The at least one processor may be further configured to execute the instructions to execute the instructions to calculate the size of the visible area of the object in the obtained image data by determining the number of pixels included in the visible area or determining an area of a polygon that bounds the visible area.

The at least one processor may be further configured to execute the instructions to obtain the image data generated by a camera sensor model of an autonomous driving simulator.

Another aspect of the present disclosure provides a non-transitory computer-readable recording medium having recorded thereon instructions executable by at least one processor to perform a method for modifying ground truth of image data for testing accuracy of an object detection machine learning model. The method includes: obtaining image data of an image capturing area from a camera point of view; obtaining ground truth data regarding objects in the image capturing area; determining a visibility rate of an object included in the obtained image data; and modifying the ground truth data based on the determined visibility rate.

The determining the visibility rate may include: determining a total size of the object; calculating a size of a visible area of the object in the obtained image data; and dividing the size of the visible area by the total size of the object to obtain the visibility rate.

The determining the total size of the object may include: individually rendering the object in full; and calculating an area of the individually-rendered object.

The determining the total size of the object may include: obtaining a ground truth object segmentation for a full scene of the image capturing area; and calculating an area of the object in the ground truth object segmentation.

The calculating the size of the visible area of the object in the obtained image data may include determining the number of pixels included in the visible area or determining an area of a polygon that bounds the visible area.

The obtaining the image data of the image capturing area may include obtaining the image data generated by a camera sensor model of an autonomous driving simulator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Hereinafter, specific embodiments to which the present disclosure is applied will be described in detail with reference to drawings. The present disclosure is not limited to the following embodiments. In addition, the following description and drawings are simplified as appropriate for the sake of clarity.

Figure 1:
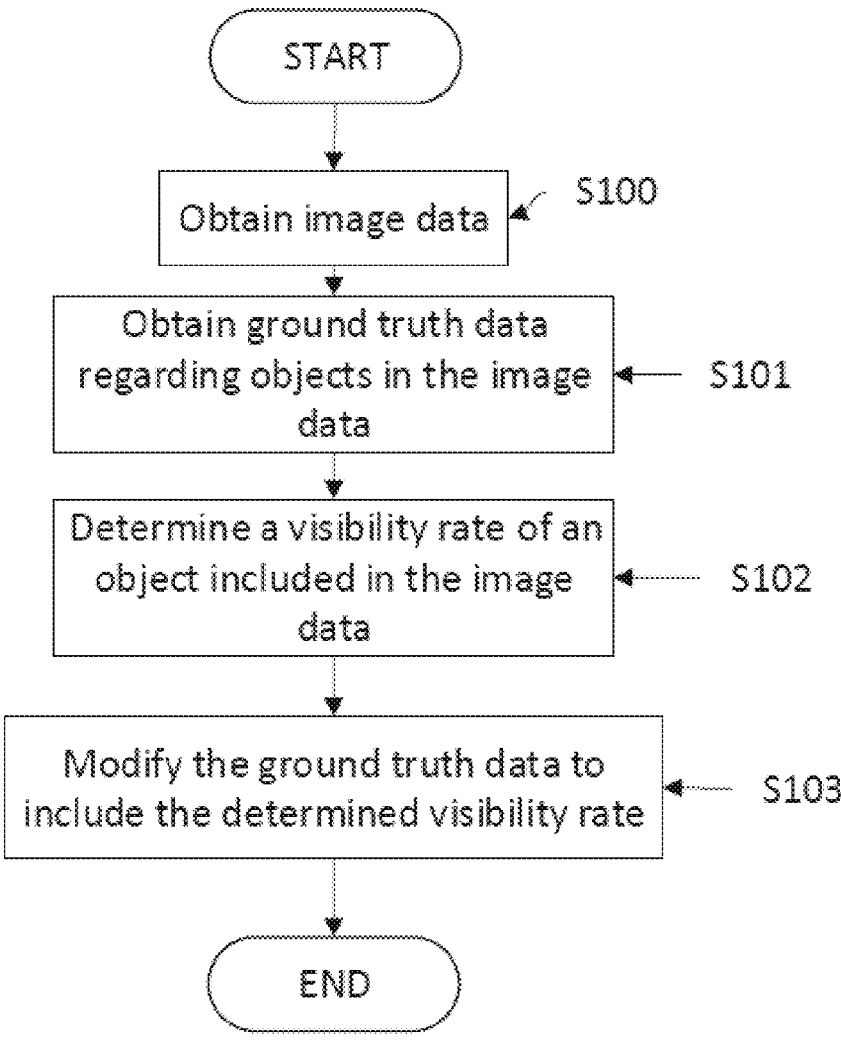
FIG. 1 is a flowchart illustrating a method for modifying ground truth data according to an embodiment.

A method for modifying ground truth according to an embodiment will now be described with reference to FIGS. 1 through 6. FIG. 1 depicts a flowchart illustrating a method for modifying ground truth data according to the first embodiment.

Referring to FIG. 1, in step S100, image data corresponding to a camera point of view is obtained. That is, the image data is of an image capturing area visible to the camera. The image data may be testing data for testing a machine learning model trained to identify objects (e.g., bounding boxes, classes, segmentations, etc.) in an autonomous driving application. For example, the image data may be generated by a camera sensor model of an autonomous driving simulator. The camera sensor model may be embedded in or interoperate with the autonomous driving simulator but is not limited thereto. The autonomous driving simulator may include any simulator utilized for testing autonomous driving applications and algorithms.

The autonomous driving simulator may include at least one processor configured to execute instructions stored in one or more computer-readable recording media. These instructions may define or be executed to implement a core simulator, a vehicle simulator, and a sensor simulator. The core simulator is the simulation tool that creates, edits, and/or executes a scenario in which the simulation is run. Via the core simulator, the virtual world of the simulation (i.e., the ground truth) can be defined, as well as the actors and their movements. The vehicle simulator simulates an autonomous driving vehicle (ego vehicle) and includes a vehicle controller to control a position of the vehicle based on surrounding objects. The sensor simulator simulates various sensors of the ego vehicle, and includes a camera sensor model for capturing images of the ego vehicle's surroundings in the virtual world.

The image data generated by the camera sensor model may include image data obtained from an individual camera sensor, or a plurality of camera sensors positioned at a plurality of locations on the autonomous driving vehicle within the simulator. These positions may include at least one of a front of the vehicle, a side of the vehicle, a rear of the vehicle, a top of the vehicle, or a combination thereof. The image data is an image of the image capturing area of the virtual world captured by the camera sensor model.

Additionally, the vehicle is not limited to a car, but may include any mechanism for transporting people or goods (i.e. trucks, buses, motorcycles, tractors, electric scooters, etc.) and capable of being driven autonomously.

Figure 8:
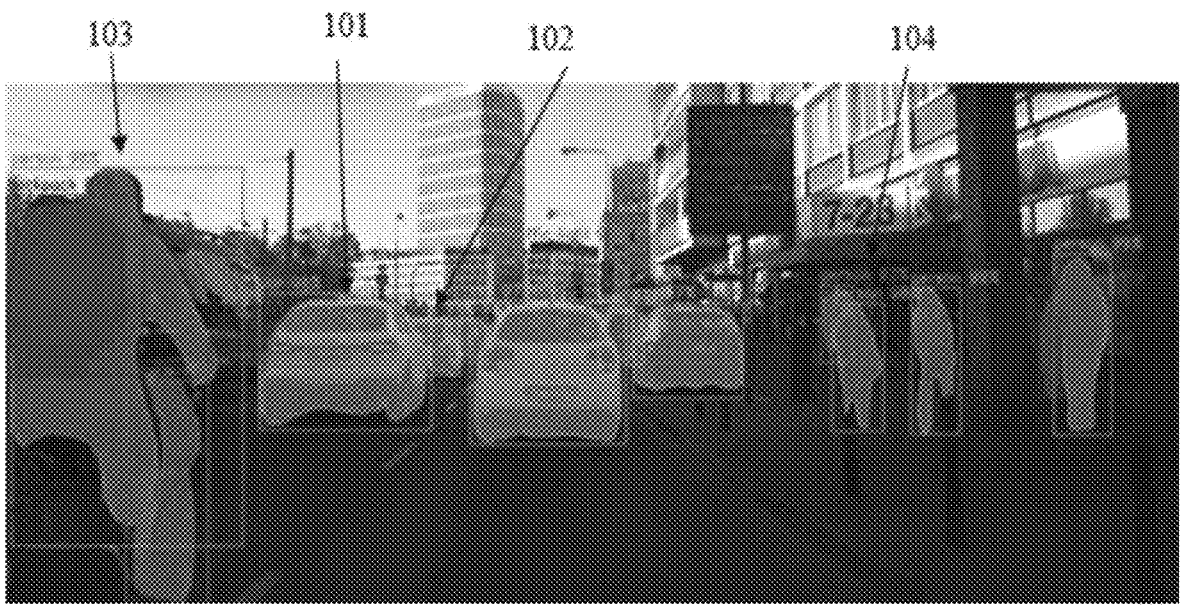
FIG. 8 is an example of image data generated by a camera sensor model of an autonomous driving simulator.

Ground truth data regarding all objects (including hidden objects) in the image capturing area is obtained at step S101. For example, the ground truth data is obtained from the simulator (e.g., the core simulator), or from any tool, model, or device that has knowledge of the objects (or stores object data) included in the virtual world. Ground truth data may include the actual classifications, segmentations, etc., of the objects (e.g. other vehicles, pedestrians, physical barriers, etc.) in the image capturing area corresponding to the image data. The ground truth data includes all of the objects, in their entirety, of the image capturing area, including those objects that are partially or fully hidden in the image data from the viewpoint of the camera (e.g., camera sensor within the camera sensor model). For example, a ground truth segmentation may include and classify the entirety of a pedestrian that is positioned behind a parked vehicle. Referring to FIG. 8, the ground truth would classify the entire segment of the second vehicle 102, even though it is positioned behind the first vehicle 101.

Referring back to FIG. 1, a visibility rate of an object in the image data from the camera's point of view is determined in step S102.

Figure 2:
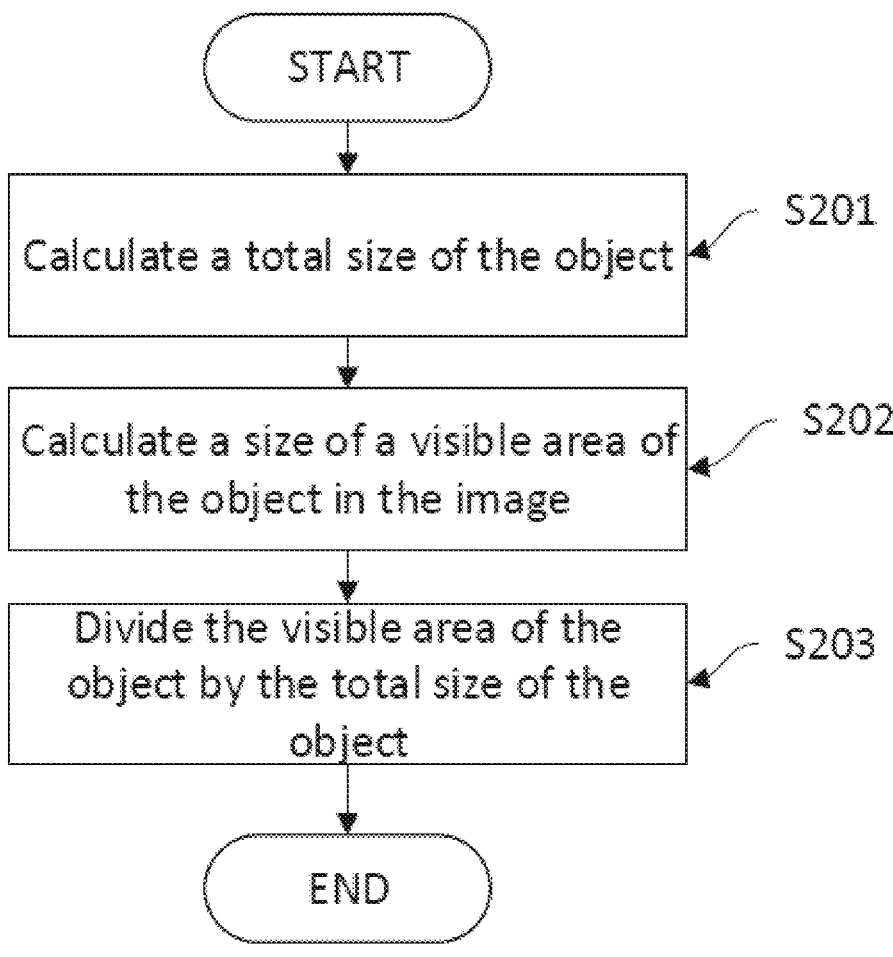
FIG. 2 is a flowchart illustrating a method for determining a visibility rate of an object according to an embodiment.

FIG. 2 depicts a flowchart of a method for determining a visibility rate of an object according to an embodiment. Referring to FIG. 2, a total size of the object (i.e., an original size in the ground truth data, including any hidden portions) is determined in step S201. The total size of the object may be determined in various manners according to embodiments. For example, the total size may be determined by individually rendering the object according to a first embodiment (described below with reference to FIG. 3) or may be determined using a ground truth segmentation (described below with reference to FIG. 4).

Figure 3:
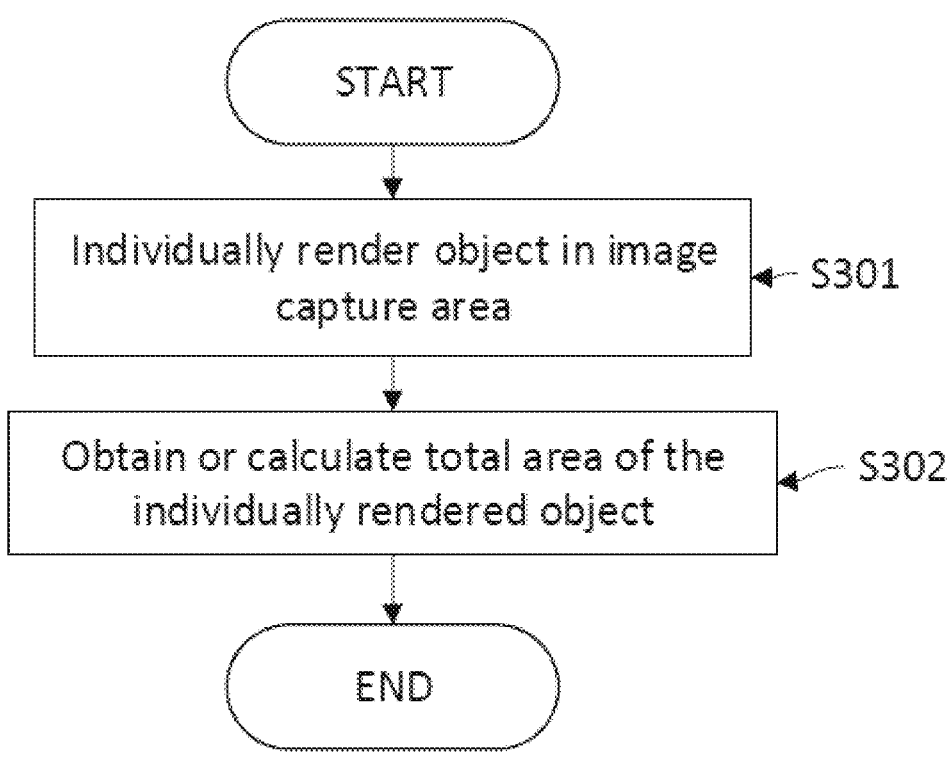
FIG. 3 is a flowchart illustrating a method for obtaining a total size of the object according to a first embodiment.

FIG. 3 is a flowchart illustrating a method of obtaining a total size of the object according to a first embodiment. Referring to FIG. 3, the object in the image capturing area is individually rendered in full in step S301. For example, the object may be rendered using object definitions for the virtual world created or incorporated via the core simulator. It is understood that only the particular target object may be individually rendered, or each of the objects in the image capturing area may be individually rendered in step S301. Further, each of particular objects may be individually rendered according to an embodiment. For example, fully and/or partially hidden objects may be individually rendered, or objects having a particular classification (e.g., pedestrians and/or vehicles) may be individually rendered in various embodiments. Next, a total area of the individually rendered object may be calculated or obtained in step S302. For example, the total area may be obtained by determining the number of pixels constituting the rendered object, or by calculating an area of a polygon that bounds the rendered object.

Figure 4:
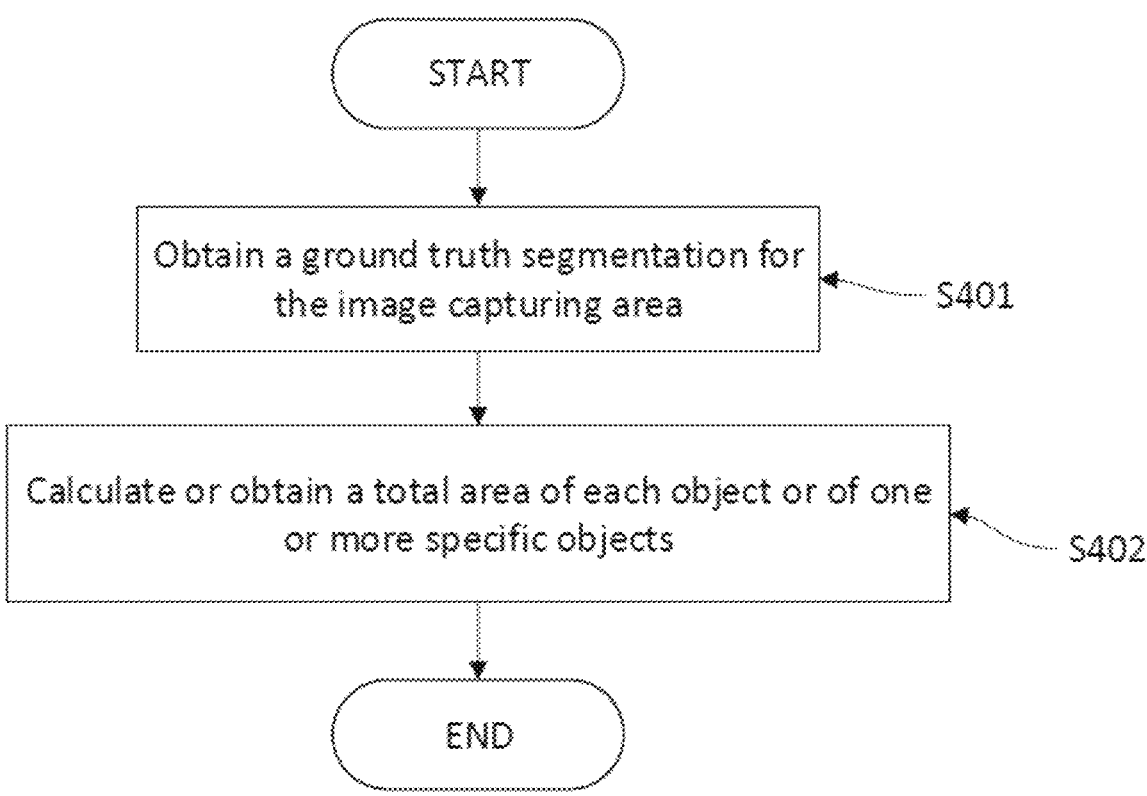
FIG. 4 is a flowchart illustrating a method for obtaining a total size of the object according to a second embodiment.

FIG. 4 is a flowchart illustrating a method of obtaining a total size of the object according to a second embodiment. According to the second embodiment, the total size of the object may be determined in step S201 via a typical ground truth segmentation. Referring to FIG. 4, a ground truth segmentation for the image capturing area may be obtained in step S401, and a total area of each object or of one or more specific objects is calculated or obtained in step S402. For example, the total area may be obtained by determining the number of pixels constituting the object in the ground truth segmentation, or by calculating an area of a polygon that bounds the object in the ground truth segmentation. Further, the areas of all of the objects in the image segmentation may be obtained, only the area of an object of interest (e.g., a particular target object that is partially or fully hidden) may be obtained, or only the areas of particular objects (e.g., objects having a specific classification such as pedestrians and/or vehicles, target objects that are partially hidden, and/or target objects that are fully hidden) may be obtained.

Figure 5:
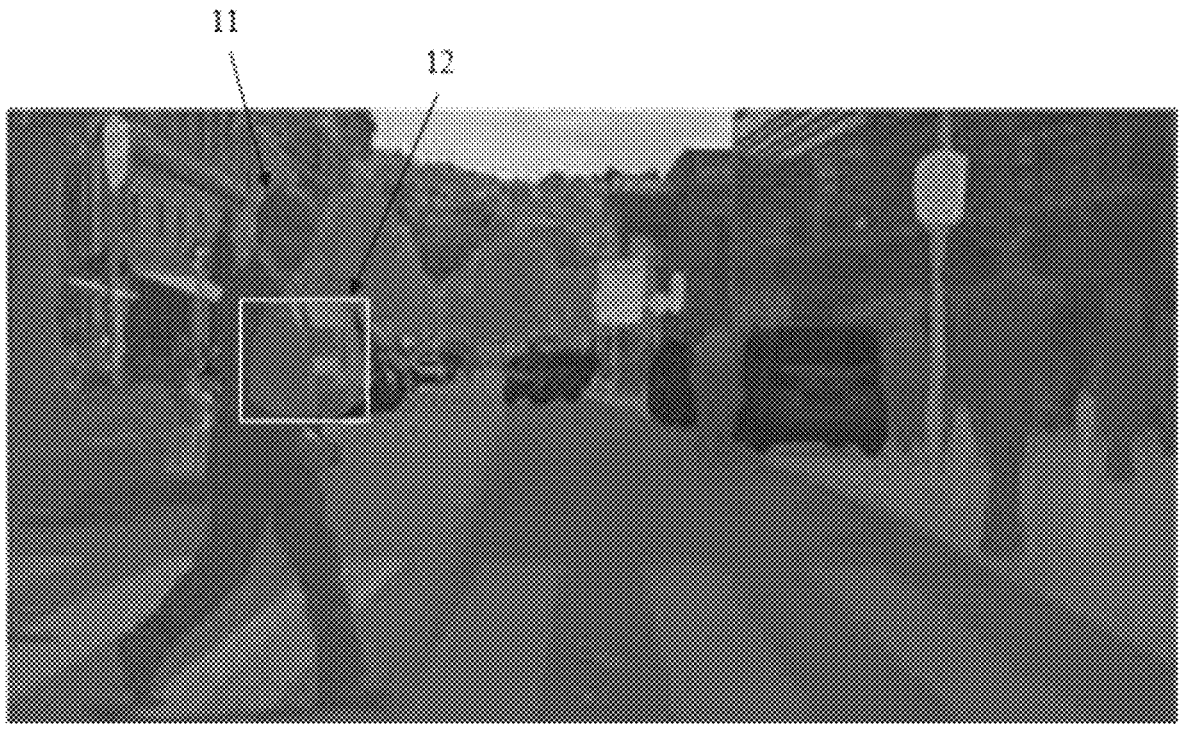
FIG. 5 is an example of image data generated by a camera sensor model of an autonomous driving simulator.

Referring back to FIG. 2, a visible area of the object in the image data (i.e., from the sensor point of view) is determined in step S202. The visible area may be determined by utilizing an object segmentation of the image data. In this case, the image data may be rendered normally, with the visible area of the objects therein rendered. Then, the visible portions of the objects in the rendered image may be segmented (e.g., by utilizing a ground truth segmentation) and an area (i.e., visible area) of a segmented object may be determined. Referring to FIG. 5, for example, the visible area of the object 12 (a parked van) partially hidden behind another object 11 (a pedestrian) may be calculated from a segmentation image for the objects from the sensor point of view.

The visible area of the object from the rendered image may be calculated by calculating the number of pixels of the visible portion of the object, or by calculating a polygon that is a similar size to the visible area of the object (e.g., that bounds the visible area of the object). However, calculating the visible area of the object is not limited thereto, and may include any formula or algorithm that can be utilized to calculate an area of an object within an image. It is understood that steps S201 and S202 may be performed in any order, or may be performed simultaneously, substantially simultaneously, or simultaneously in part.

The visibility rate of the object is determined in step S203. The visibility rate may be calculated by dividing the size of the visible area of the object determined in step S202 by the total size of the object determined in step S201. For example, the number of pixels of the visible portion of the object may be divided by the number of pixels of the total size of the object, resulting in a percentage of the object (i.e., visibility rate) that is visible from the perspective of the sensor. By way of another example, the visibility rate may be calculated by dividing the area of the polygon of the visible area of the object by the area of the polygon of the total size of the object.

Referring back to FIG. 1, the visibility rate is utilized to modify the ground truth data in step S103. For example, if the visibility rate is 50%, then the ground truth data is modified by this rate for the individual object. In this case, an intersection over union (IOU), mean average precision (mAP), or any other evaluation metric may incorporate the visibility rate to the ground truth data. Further, where the visibility rate is 0% (or less than a predetermined threshold), the object may be omitted from the ground truth data. Additionally, according to an embodiment, only visibility rates for objects that are below a predetermined threshold (e.g., below 85% or 75%) may be used to modify the ground truth data.

Figure 6:
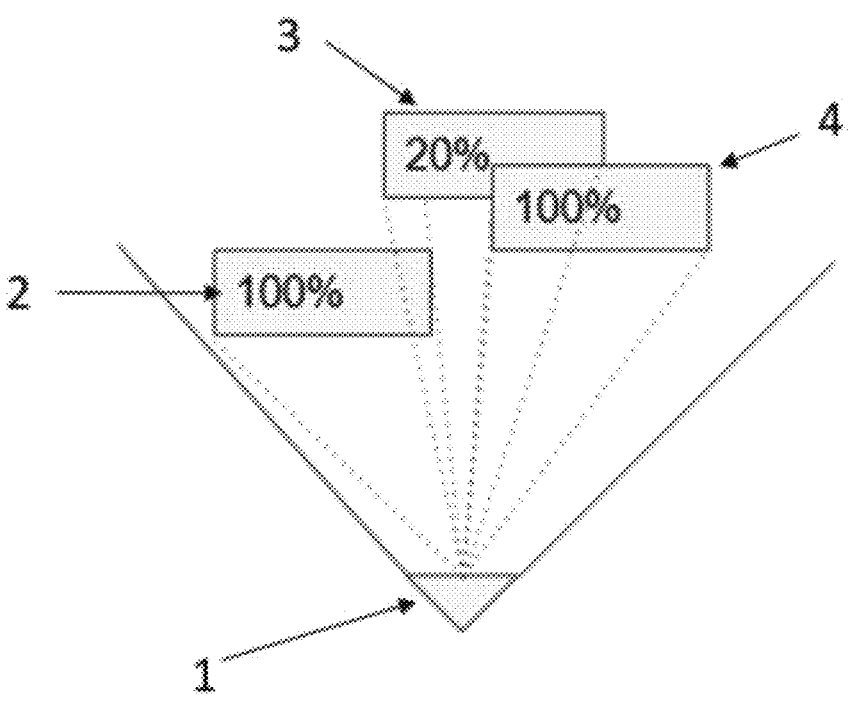
FIG. 6 is a schematic view of an example of a visibility rate determination for objects according to an embodiment.

Referring to the example of FIG. 6, the visibility rates for objects 2, 3, and 4 are determined as shown. That is, objects 2 and 4 have a 100% visibility rate, while object 3 has a 20% visibility rate. As described above, the visibility rate of object 3 may be determined by individually rendering the object 3 to calculate its total size according to the first embodiment, or by obtaining its total size from a segmentation image for the full scene of the image capturing area (i.e., a ground truth segmentation) according to the second embodiment. The total size of the object 3 may be determined as 300 pixels. Further, the visible area of the object 3 is determined by segmenting the object in the sensor-captured image data. In this example, the visible area of the object 3 may be determined as 60 pixels. Thus, the visibility rate of 20% can be determined by dividing the size of the visible area (60 pixels) by the total size of the object (300 pixels). FIG. 6 also shows the camera sensor viewpoint 1 in relation to objects 2, 3, and 4.

The ground truth data may then be modified based on the visibility rate for each of the objects 2, 3, and 4 in FIG. 6. This modification accounts for the hidden portions of the objects that are included in the ground truth data and modifies the ground truth data accordingly. The modified ground truth data may be utilized to evaluate the results from a machine learning model (e.g. by comparing the modified ground truth data with the results from the machine learning model) when testing the accuracy of the object detection using the machine learning model, thereby resulting in a more accurate test.

Figure 7:
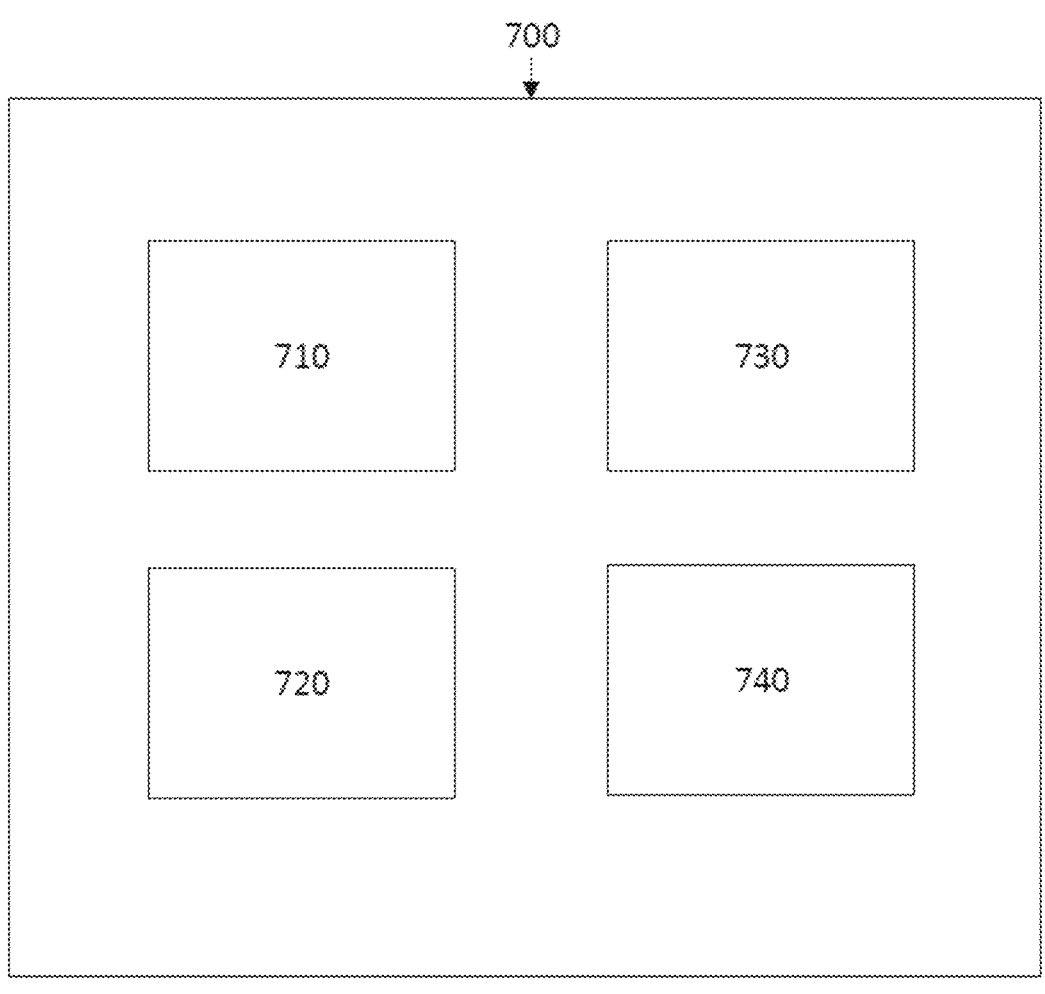
FIG. 7 is a block diagram of an apparatus for modifying ground truth data according to an embodiment.

FIG. 7 is a block diagram of an apparatus 700 for modifying ground truth data according to an embodiment. The apparatus 700 may be implemented as or within a personal computer, a laptop computer, a mobile device, a workstation, a client terminal, a server, etc. Referring to FIG. 7, the apparatus 700 includes a memory 710 storing instructions and/or software code, and a processor 720 (e.g., at least one processor) configured to execute those instructions and/or code to implement one or more of the methods described above with reference to FIGS. 1 through 4. The processor 720 may be implemented as at least one of an application specific integrated circuit (ASIC), an embedded processor, a microprocessor, hardware control logic, a hardware finite state machine (FSM), a digital signal processor (DSP), a neural network processor (NPU), or the like. The processor 720 may include a central processing unit (CPU), a graphic processing unit (GPU), and a main processing unit (MPU), or the like. In addition, the processor 720 may include one or more processors.

The memory 710 may include a semiconductor memory, such as a flash memory, a magnetic storage medium such as a hard disk, or the like. The memory 710 may refer to any volatile or non-volatile memory, a read-only memory (ROM), a random access memory (RAM) communicatively coupled to the processor 110 or a memory card (e.g., a micro SD card, a memory stick) connectable to the apparatus 100. The memory 710 may store various software modules or codes for operating the apparatus 700, and the processor 720 may control the operations of the apparatus 700 by executing various software modules that are stored in the memory 710. That is, the memory 710 may be accessed by the processor 720 to perform data reading, recording, modifying, deleting, updating or the like. Further, the memory 710 may store executable instructions, code, data objects etc.

In addition, the apparatus 700 may include a display 730 and an input interface 740. According to an embodiment, the display 730 may output any of the above-described images. For example, the display 730 may output the image data of the image capturing area from the perspective of the camera, individually rendered objects, and/or a ground truth segmentation. The input interface 740 may receive a user input for selecting a target object in the displayed image for which to calculate the visibility rate and/or modify the ground truth data.

The display 730 may be implemented as a liquid crystal display (LCD) panel, an organic light emitting diode (OLED) display, a flexible display, a touch screen display, a transparent display, or the like. The processor 720 may control the display 730 to display image signals.

The input interface 740 may be configured to receive an input from a user or other devices, and the processor 720 may receive a user command for controlling the operations of the apparatus 700 through the input interface 740. The input/output interface 740 may include, for example, a microphone, a camera, a remote controller, a keyboard, a mouse, a touch screen, or the like.

According to an embodiment, a method and an apparatus disclosed herein may be provided as software of a computer program product. A computer program product may be distributed in the form of a machine readable storage medium (e.g., compact disc read only memory (CD-ROM)) or distributed online through an application store or between two devices directly. In the case of on-line distribution, at least a portion of the computer program product (e.g., a downloadable app) may be stored temporarily or at least temporarily in a storage medium such as a manufacturer's server, a server in an application store, or a memory in a relay server.

Embodiments of the disclosure have been shown and described above, however, the embodiments of the disclosure are not limited to the aforementioned specific embodiments. It may be understood that various modifications, substitutions, and improvements can be made by those having ordinary skill in the art in the technical field to which the disclosure belongs, without departing from the spirit of the disclosure as claimed by the appended claims. It should be understood that such modifications, substitutions, and improvements shall fall within the protection scope of the disclosure, and should not to be construed independently from the technical idea or prospect of the disclosure.

What is claimed is:

1. A method for modifying ground truth of image data for testing accuracy of an object detection machine learning model, the method comprising:
   obtaining virtual image data of an image capturing area from a camera point of view;
   obtaining ground truth data regarding virtual objects in the image capturing area;
   determining a total size of a virtual object in the virtual image data by:
   individually rendering the virtual object in full; and
   calculating an area of the individually-rendered virtual object;
   calculating a size of a visible area of the virtual object in the virtual image data;
   determining a visibility rate of the virtual object by dividing the size of the visible area by the total size of the virtual object;
   determining whether the visibility rate of the virtual object is at or above 0% and below a first predetermined threshold, at or above the first predetermined threshold and below a second predetermined threshold higher than the first predetermined threshold, and at or above the second predetermined threshold higher than the first predetermined threshold; and
   based on the visibility rate being at or above 0% and below the first predetermined threshold, omitting the virtual object from the ground truth data;
   based on the visibility rate being at or above the first predetermined threshold and below a second predetermined threshold higher than the first predetermined threshold, modifying the ground truth data for the virtual object by the determined visibility rate; and
   based on the visibility rate being at or above the second predetermined threshold higher than the first predetermined threshold, not modifying the ground data for the virtual object by the determined visibility rate.

2. The method of claim 1, wherein the determining the total size of the virtual object comprises:
   obtaining a ground truth object segmentation for a full scene of the image capturing area; and
   calculating an area of the virtual object in the ground truth object segmentation.

3. The method of claim 1, wherein the calculating the size of the visible area of the virtual object in the virtual image data comprises determining a number of pixels included in the visible area or determining an area of a polygon that bounds the visible area.

4. The method of claim 1, wherein the obtaining the image data of the image capturing area comprises obtaining the image data generated by a camera sensor model of an autonomous driving simulator.

5. The method for modifying ground truth of image data of claim 1, wherein modifying the ground truth data for the virtual object with the determined visibility rate comprises using an intersection over union metric.

6. The method for modifying ground truth of image data of claim 1, wherein modifying the ground truth data for the virtual object with the determined visibility rate comprises using a mean average precision metric.

7. An apparatus for modifying ground truth of image data for testing accuracy of an object detection machine learning model, the apparatus comprising:

memory storing instructions, and at least one processor configured to execute the instructions to:

obtain virtual image data of an image capturing area from a camera point of view;

obtain ground truth data regarding virtual objects in the image capturing area;

determine a total size of a virtual object in the virtual image data by:

individually rendering the virtual object in full; and calculating an area of the individually-rendered virtual object;

calculate a size of a visible area of the virtual object in the virtual image data;

determine a visibility rate of the virtual object by dividing the size of the visible area by the total size of the virtual object;

determine whether the visibility rate of the virtual object is at or above 0% and below a first predetermined threshold, at or above the first predetermined threshold and below a second predetermined threshold higher than the first predetermined threshold, and at or above the second predetermined threshold higher than the first predetermined threshold; and based on the visibility rate being at or above 0% and below the first predetermined threshold, omit the virtual object from the ground truth data;

based on the visibility rate being at or above the first predetermined threshold and below a second predetermined threshold higher than the first predetermined threshold, modify the ground truth data for the virtual object by the determined visibility rate; and based on the visibility rate being at or above the second predetermined threshold higher than the first predetermined threshold, not modify the ground data for the virtual object by the determined visibility.

8. The apparatus of claim 7, wherein the at least one processor is further configured to execute the instructions to:

obtain a ground truth object segmentation for a full scene of the image capturing area; and calculate, as the total size of the virtual object, an area of the virtual object in the ground truth object segmentation.

9. The apparatus of claim 7, wherein the at least one processor is further configured to execute the instructions to calculate the size of the visible area of the virtual object in the virtual image data by determining a number of pixels included in the visible area or determining an area of a polygon that bounds the visible area.

10. The apparatus of claim 7, wherein the at least one processor is further configured to execute the instructions to obtain the image data generated by a camera sensor model of an autonomous driving simulator.

11. A non-transitory computer-readable recording medium having recorded thereon instructions executable by at least one processor to perform a method for modifying ground truth of image data for testing accuracy of an object detection machine learning model, the method comprising:

obtaining virtual image data of an image capturing area from a camera point of view;

obtaining ground truth data regarding virtual objects in the image capturing area;

determining a total size of a virtual object in the virtual image data by:

individually rendering the virtual object in full; and calculating an area of the individually-rendered virtual object;

calculating a size of a visible area of the virtual object in the virtual image data;

determining a visibility rate of the virtual object by dividing the size of the visible area by the total size of the virtual object;

determining whether the visibility rate of the virtual object is at or above 0% and below a first predetermined threshold, at or above the first predetermined threshold and below a second predetermined threshold higher than the first predetermined threshold, and at or above the second predetermined threshold higher than the first predetermined threshold; and based on the visibility rate being at or above 0% and below the first predetermined threshold, omitting the virtual object from the ground truth data;

based on the visibility rate being at or above the first predetermined threshold and below a second predetermined threshold higher than the first predetermined threshold, modifying the ground truth data for the virtual object by the determined visibility rate; and based on the visibility rate being at or above the second predetermined threshold higher than the first predetermined threshold, not modifying the ground data for the virtual object by the determined visibility rate.

12. The non-transitory computer-readable recording medium of claim 11, wherein the determining the total size of the virtual object comprises:

obtaining a ground truth object segmentation for a full scene of the image capturing area; and calculating an area of the virtual object in the ground truth object segmentation.

13. The non-transitory computer-readable recording medium of claim 11, wherein the calculating the size of the visible area of the virtual object in the virtual image data comprises determining a number of pixels included in the visible area or determining an area of a polygon that bounds the visible area.

14. The non-transitory computer-readable recording medium of claim 11, wherein the obtaining the image data of the image capturing area comprises obtaining the image data generated by a camera sensor model of an autonomous driving simulator.

* * * * *